Nov. 22, 1927.

J. JONAS ET AL 1,650,072

FLAME ARC FURNACE

Filed Nov. 10, 1926  2 Sheets-Sheet 1

Witness:
A. Burkhardt

Inventors:
Julius Jonas
Walter Niggeler
By Cromwell, Greist & Warden
attys.

Nov. 22, 1927.
J. JONAS ET AL
1,650,072
FLAME ARC FURNACE
Filed Nov. 10, 1926   2 Sheets-Sheet 2
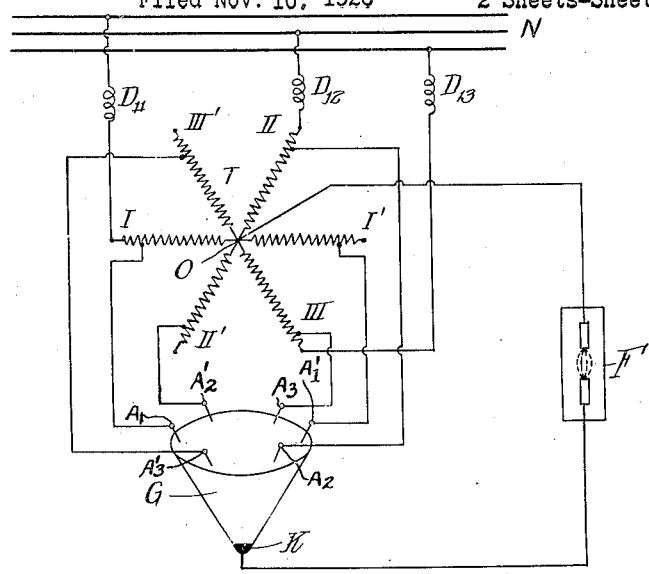
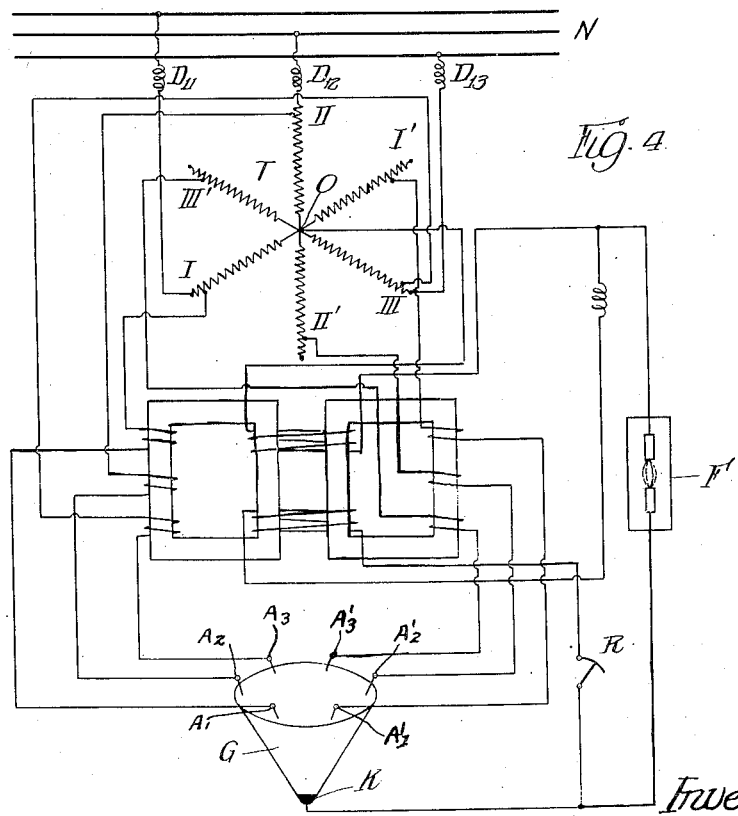
Witness:
R. Burkhardt
Inventors
Julius Jonas,
Walter Niggeler,
By Cromwell, Greist & Warden
Attys Patented Nov. 22, 1927.

1,650,072

UNITED STATES PATENT OFFICE.

JULIUS JONAS AND WALTER NIGGELER, OF BADEN, SWITZERLAND, ASSIGNORS TO AKTIENGESELLSCHAFT BROWN BOVERI & CIE., OF BADEN, SWITZERLAND, A JOINT-STOCK COMPANY.

FLAME-ARC FURNACE.

Application filed November 10, 1926, Serial No. 147,438, and in Switzerland November 21, 1925.

Our invention relates to flame arc furnaces, and it has particular relation to arrangements for supplying current to furnaces operating with high-voltage flame arcs utilized in electro-chemical industries.

In certain electro-chemical applications, particularly in the nitrogen fixation industries, high-voltage arc furnaces are employed for maintaining a large arc through which air is being passed for changing the nitrogen in the air into nitric oxide, from which a stable nitrogen compound, suitable for fertilizer purposes, explosives, and the like, is obtained. Heretofore, alternating current has been principally used for supplying the arc in such furnaces on account of the relative ease with which high voltage current for furnace operation could be obtained and the relatively simple arc stabilization by means of choke coils. On the other hand, it has been recognized that direct current would be preferable for the operation of such furnaces, both from the standpoint of the greater nitrogen output for the same amount of power input, and, also by reason of the greater ease with which direct current arcs can be maintained. However, the high voltage required for the arc operation and the costlier stabilizing equipment that seemed theretofore necessary in direct-current flame arc installations have substantially excluded the latter type of furnaces from the industry.

According to our invention, a flame arc furnace installation combining the advantages of the alternating-current operation with those of the direct-current operation are obtained by supplying the flame arc with current from a rectifier, so connected between an alternating-current source and the flame arc as to supply to the latter high-voltage direct current that is being stabilized by means of stabilizing equipment embodied in the alternating-current supply connections of the rectifier.

Figure 1:
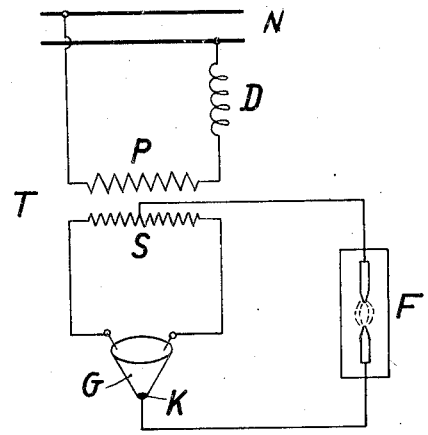
Figure 2:
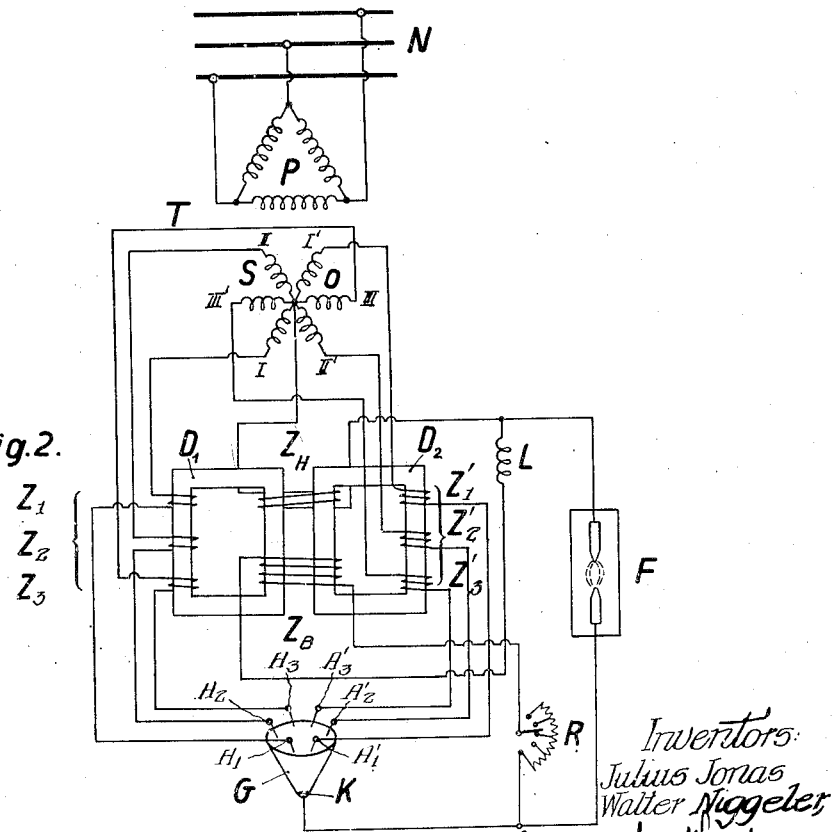

In the accompanying drawings,

Fig. 1 is a diagrammatic view of a flame-arc installation arranged according to our invention; and Figs. 2 to 4 are a view similar to Fig. 1, showing other modifications of our invention.

In the various systems for fixing atmospheric nitrogen by passing air through an arc flame, such as that of Birkeland-Edye, Pauling, Moscicki, or Schonherr-Hessberger, it has hitherto been customary to maintain the flame arc with alternating current, since the latter type of supply permitted the easier stabilization of the relatively high intensity arcs, that are sometimes six feet, or more, long, and require voltages of as much as 6000 volts or more.

It was found that reactors connected in the alternating-current circuit produce a very strong stabilizing effect on the arc by opposing sudden changes in the arc current, the voltage in the reactor being either added or subtracted to that of the source, according to the tendency of the current to decrease or increase, respectively. The reactor secures an automatic regulation of the arc voltage so that, within certain limits, a constant alternating current is obtained.

Although the foregoing characteristics made alternating-current operation so advantageous that it is now almost exclusively used in practical installations, it is, nevertheless, connected with very serious disadvantages inasmuch as the stabilizing reactors must be relatively large, requiring relatively high reactive currents from the network, and giving a very poor power factor. The reasons therefore may be stated as follows: In the case of direct current, the stabilizing equipment has to take care only of fluctuations of a unidirectional current. In the case of alternating current, the current goes twice through zero during each cycle, and accordingly, if the arc has a tendency to become unstable and extinguish, this tendency will be still further increased if it is operated by alternating current. In order to offset this increased tendency to instability, the reactors used in alternating-current arc operation must be of very large size, to secure arc re-ignition under all circumstances. Because of the large size of the reactors, the installations require very large reactive currents, and operate with very low power factor, thus decreasing the economy of the plants.

On the other hand, the use of direct current for flame-arc furnaces has also disadvantages, but of a different kind. To stabilize direct current arcs either reactors, or ohmic resistors, may be used. In case of stabilizing reactors, their size becomes excessive, since they must be designed to carry the full normal arc load current, on which the current fluctuations are superimposed and the magnetic circuit must carry the flux produced by the normal current, and, in addition, permit free development of the superimposed stabilizing fluxes induced by current fluctuations. In case of ohmic stabilizing resistors, the power losses become very considerable and decrease the over-all efficiency of the plant to a point where their use becomes economically prohibitive.

Thus, while the reactors used in alternating-current arc-supply systems are not subject to the disadvantage of having to carry, in addition to the fluctuating or stabilizing flux, the full flux induced by the unidirectional normal arc-load current, these reactors must nevertheless be relatively large by reason of the greater tendency to instability in alternating current arcs, and the consequent higher requirements with respect to the stabilizing capacity of the reactors.

Our invention combines the advantages inherent in the stabilization direct-current arcs, with those inherent in stabilizing equipment associated with alternating-current supply sources for such arcs, while avoiding the disadvantages of the two systems of supply. To this end the arc of the flame furnace is maintained by direct current derived from a special converter which permits arc stabilization with reactors of relatively small dimensions compared to those utilized in pure alternating-current, or in pure direct-current arc supply systems.

In the power supply equipment for flame arc furnaces, according to our invention, a rectifier, preferably a mercury-arc rectifier, is arranged to supply the arc with direct current, while the reactor means for stabilizing the arc are connected on the alternating current side of the rectifier.

An arrangement of such character is shown in Fig. 1 in which a flame arc F, of a type employed in the nitrogen fixation plants, for instance, has its terminals connected between a cathode K of a mercury-arc rectifier G, and a mid-point of a secondary winding S of a transformer T having a primary winding P connected in series with a reactor or choke coil D, to an alternating current line N. With the foregoing arrangement, current fluctuations of the arc that tend to affect stability thereof, will immediately be reflected in the alternating current side of the rectifier, and the voltage drop in the reactor D connected in the alternating current rectifier supply circuit will be reflected on the direct current side thereof, which supplies the arc, thereby exercising a stability affect of the same character if there were a resistor or reactor of suitable size in the direct current-circuit. However, since the stabilizing reactor D is on the alternating-current side of the rectifier, it will have only a fraction of the size of a reactor that would be required to secure the same stabilizing effect, if connected in the direct-current line supplying the arc, since the reactor is not traversed by a large unidirectional current component of the load, as in the case of a pure direct-current arc supply.

On the other hand, the utilization of the direct current to maintain the long high-voltage flame arc greatly reduces the amount of stabilizing reactance required in the alternating-current supply circuit of the rectifier, and a very considerably smaller reactor, as compared to a pure alternating current arc supply, will be sufficient to secure a high degree of arc stability, quite apart from the benefits inherent in the operation of the arc furnaces with direct current.

The amount of stabilizing reactance on the alternating current side of the rectifier becomes particularly small, compared to a pure alternating current flame arc supply, by reason of the utilization of a polyphase arc rectifier, since the polyphase supply of such rectifiers will secure a stable rectifying arc with a very small amount of reactance in the circuit as compared to direct operation of flame arcs from the alternating-current source.

The use of the type of alternating-current to direct-current converters described above permits a reduction of the stabilizing reactance and better flame-arc operation for still other reasons. Thus, it has been shown, for instance, in German Patent 339,182, and in U. S. Patent 1,434,346, of J. Jonas, that by connecting suitable choke coils or reactors in the anode circuits of a rectifier, and exciting said choke coils with a unidirectional current, in addition to the anode currents, it is possible to regulate the direct-current voltage derived from the rectifier. In particular, the foregoing patents also describe an arrangement whereby the direct current derived from the rectifier may be utilized to add an additional compound excitation on said choke coils so as to obtain a compound regulation of the direct current voltage. By supplying a flame-arc furnace with direct current derived from a rectifier having a compound regulation of the above described character, the special stabilizing reactor in the alternating current circuit of the rectifier may be made very small, or even be entirely dispensed with.

Such an arrangement is shown in Fig. 2, in which a flame arc furnace F is supplied with direct current from a mercury-arc rectifier G. One arc terminal of the furnace is connected to the cathode K of the rectifier, while the other terminal thereof is connected to a neutral point O of secondary six-phase star-connected windings S of a transformer T, the primary winding P of which is supplied in delta from a polyphase line N. The secondary windings S of the transformer T are arranged into symmetrical three-phase groups, I, II, III, and I′, II′, III′, which are, respectively, in phase opposition. The end terminals of the two polyphase winding groups are connected to two sets of choke coils $Z_1, Z_2, Z_3$, and $Z_1', Z_2', Z_3'$, respectively. Each set of choke coils $Z_1, Z_2, Z_3$, and $Z_1', Z_2', Z_3'$, are similarly wound on suitable choke coil cores, $D_1, D_2$, to magnetize the latter in the same sense, respectively.

In order to regulate the voltage at the direct-current terminals of the rectifier, an additional shunt exciting coil $Z_B$ may be provided around the cores $D_1, D_2$ of the anode choke coils to magnetize the same in the same sense in which they are magnetized by the anode currents. A suitable reactor or choke coil L, for smoothing out the shunt exciting current, and a control resistor R are included in the shunt exciting circuit. By varying the amount of resistance included in the shunt exciting circuit, the magnetization of the two choke coil cores $D_1, D_2$, may be varied, and the effective inductance of the anode choke coils changed to secure the desired voltage regulation of the rectifier.

In order to secure the compound action described above, one of the direct current leads, for instance, the connection to the neutral point O of the six-phase secondary transformer windings S, has included therein a compound exciting winding $Z_H$ arranged to magnetize the cores $D_1, D_2$, of the anode choke coils in order to so vary the flux conditions in the cores as to secure the desired compounding effect. The compound winding $Z_H$ will cause an automatic variation of the direct-current excitation of the choke-coil cores in response to a variation of the main direct current flow. By suitably adjusting the shunt excitation with respect to the compound excitation, any required degree of compounding may be obtained.

The foregoing arrangement of the choke coils in the anode circuit is in a sense equivalent to a reactor connected in the alternating current circuit of the rectifier. However, by reason of the additional shunt and compound excitations of the cores of the anode choke coils, the effective inductance thereof will vary and will be very small for large normal load currents. The full effect of the reactance will, accordingly, be felt only at small currents when the voltage drop in the choke coils is a maximum, that is, at relatively low direct current at which the full stabilizing effect is required, and obtained. At normal loads, the choke coils will have relatively low inductance on account of the relatively large direct-current excitation of the choke coil cores. Accordingly, since the reactance in the current is kept relatively small when the current demand is large, that is under normal operating conditions, the power factor of the installation will be good. The reactive power demand will increase only in the moments when the load current becomes small, and accordingly, will be of little effect on the plant that supplies the power. Thus, the power factor of the installation is only slightly affected as long as the arc current is normal, and the wattless current into the reactors increases only at the times when the load current has dropped, which is of no detriment to the economy of the installation.

Instead of connecting the choke coils in the anode circuit of the rectifier, they may be connected in the primary circuit of the supply transformer. Furthermore, instead of providing distinct reactors or choke coils, the same effect may be secured by increasing the leakage reactance of the supply transformers by suitable means responsive to the arc current to so increase the leakage flux of the transformer as to secure the desired stabilizing effect.

The arrangement of the stabilizing reactors on the alternating current side of the transformers which supply the rectifier utilized in a flame arc furnace system of our invention as described above, is also a great advantage inasmuch as it permits the use of autotransformers for supplying the rectifiers while retaining the advantages which usually are responsible for the installation of high-voltage rectifiers with transformers having separate primary and secondary windings.

In the usual rectifier installation in which the load current undergoes relatively large fluctuations, it has been found necessary to use transformers having separate primary and secondary windings even where, for other reasons, autotransformers would have been more practical, for instance, where the alternating-current and the direct current voltages are close to each other. Rectifier relations with fluctuating currents, are, namely, very often a source of surges and over-voltages which must be kept away from the primary network since a steep wave front of such surges usually causes very serious damage to generators, or other apparatus connected to the primary line network. The provision of the rectifier supply transformers with separate primary and secondary windings, affords the simplest way of protecting the same, since the separation of the windings and the relatively large leakage between the same effectively prevents the penetration of voltage surges of the secondary winding into the primary winding, and also reduces the effect of sudden load changes on the primary line conditions.

In the flame arc furnace installations of our invention, utilizing rectifiers for supplying the arc current and stabilizing reactors connected in the alternating current circuit of the rectifiers, as described above, we may derive the full economies inherent from the construction of autotransformers for supplying the rectifiers without endangering the network by the surges resulting from the arc operation, although, the load may be subject to very sudden fluctuation, for instance, the extinguishment of the arc. The choke coil reactors, which are included between the primary winding of the transformer and the network, will prevent the penetration of current or voltage surges into the line, and as effectively protect the latter as the provision of separate transformer windings.

An arrangement of the foregoing character is shown in Fig. 3, in which an autotransformer T, has three transformer phase windings I', II', III', connected through choke coils $D_{11}$, $D_{12}$, $D_{13}$, to a polyphase line N. The three-phase windings are connected at their midpoints into a neutral point O so that they may be used as a source of six phase voltages. The transformer has thus phase winding system by which the number of the primary supply phases has been multiplied in order to provide a larger number of supply phases than the primary network.

From suitable taps on the six-phase windings, I, II, III, and I', II', III', of the autotransformer T, connections are made to six anodes $A_1$, $A_2$, $A_3$, $A_1'$ $A_2'$, $A_3'$ of the rectifier G having a cathode K connected to one terminal of the flame-arc furnace, the other terminal on the flame-arc furnace leading to the neutral point O of the autotransformer.

By providing autotransformation in the manner described above, under simultaneous multiplication of the number of phases available for the supply of the rectifier, a very stable direct current will be obtained with a transformer requiring a minimum of material and expense. At the same time, the reactors or choke coils connected between the network and the supply transformer will carry out the double function of stabilizing the arc in the flame furnace and also of protecting the network from surges that usually accompany operation of arcs of this type.

In Fig. 4 is shown a modification of our invention in which an installation provided with an autotransformer and choke coils in front of the autotransformer, as shown in Fig. 3, has in addition a compounding arrangement such as shown in Fig. 2. The latter arrangement combines the benefits of the two systems, and permits suitable reduction in the size of the reactors connected in front of the supply autotransformer.

By providing a flame arc installation of the character described above, it is thus possible to secure the maximum efficiency in furnace operation with a minimum of cost and equipment, the several elements of the installation being particularly designed to take mutual advantage of the characteristic properties of the other elements, and as a result, harmonious co-operation which secures maximum effect and economy is obtained.

We claim as our invention:

1. In a flame-arc furnace installation, comprising a plurality of electrodes for maintaining a flame arc and an alternating-current line for supplying said arc, means for supplying energy from said line to said arc comprising, a rectifier connected to said line for converting alternating current derived therefrom into direct current, means for supplying said direct current to said arc electrodes for maintaining a direct-current flame arc in said furnace, and reactance means so associated with said rectifier on the alternating current side thereof as to stabilize said flame arc.

2. The combination with an arc-flame furnace comprising a plurality of electrodes for maintaining a flame arc, and an alternating current line, of a rectifier connected between said line and said furnace to convert the alternating current into direct current supplied to said electrodes to maintain a direct-current arc flame, and reactor means included in the connections between said rectifier and said line to stabilize said flame arc.

3. The combination with an arc-flame furnace having a pair of electrodes for maintaining a flame arc and an alternating-current line for supplying energy to maintain said arc, of a rectifier having a number of rectifying paths greater than the number of phases of said line, said rectifier being connected to said line to cause a plurality of paths of said rectifier greater than the number of phases of said line to convert alternating current derived from said line into direct current, means for supplying said direct current to said arc electrode to maintain a flame arc, and reactor means connected between said rectifier and said alternating-current line for stabilizing said flame arc.

4. The combination with a flame arc furnace having a plurality of electrodes for maintaining a flame arc and an alternating-current line, of a rectifier connected between said line and said electrodes to supply the latter with direct current for maintaining a flame arc, and means associated with said rectifier for so regulating the current derived therefrom as to secure stable operation of the flame arc.

5. In a flame-arc furnace installation, a plurality of electrodes for maintaining a flame arc, an alternating current line, a rectifier connected between said line and said arc electrodes to convert alternating current derived from said line into direct current supplied to said arc electrodes for maintaining a flame arc, reactor means connected between said rectifier and said line, and means for so varying the effective inductance of said reactor means as to cause the current flowing to said arc to exercise a compounding action on the direct-current derived from said rectifier.

6. In a flame-arc furnace, a pair of electrodes for maintaining a flame arc, an alternating current line, a rectifier having direct current terminals connected to supply direct current to said electrodes for maintaining a flame arc, a transformer connected between said alternating current line and said rectifier to supply alternating current to be rectified therein for supplying said arc, and reactor means connected between said transformer and said line to stabilize said flame arc.

7. The combination with a flame-arc furnace having a plurality of electrodes for maintaining a flame arc and an alternating-current line, of a rectifier having direct current terminals connected to said arc electrodes for supplying direct current thereto to maintain a flame arc, and a transformer connected between said line and said rectifier to supply the latter with alternating current for converting the same into direct current for said arc, said transformer having a relatively large leakage reactance for stabilizing said flame arc.

8. The combination with a flame-arc furnace comprising a plurality of electrodes and an alternating current line, of a rectifier having direct-current terminals connected to said arc electrodes for maintaining a flame arc therebetween, said rectifier having a larger number of phases than said alternating-current line, a transformer connecting said rectifier and said line, said transformer being so arranged as to supply said rectifier with polyphase currents of a number of phases corresponding to the phases of said rectifier, and reactor means included in the circuit between said alternating current line and said rectifier to stabilize said flame arc.

9. In a flame-arc furnace installation, a plurality of electrodes for maintaining a flame arc, an alternating-current line, a polyphase rectifier, a transformer connected between said line and said rectifier, said transformer having means for converting the alternating current from said line into an alternating current of a larger number of phases corresponding to the phases of said rectifier, means for supplying direct current from said rectifier to said arc electrodes for maintaining a flame arc therebetween, and choke-coil means connected between said transformer and said line for stabilizing said flame arc.

10. The combination as defined in claim 9, characterized by the fact that the transformer is of the autotransformer type.

11. The combination with a flame-arc furnace having a pair of electrodes for maintaining a flame arc and an alternating-current line, of a mercury-arc rectifier, an autotransformer connected between said rectifier and said line to supply alternating current to said rectifier, means for supplying rectified direct current from said rectifier to said electrodes to maintain a flame arc therebetween, and reactor means connected between said transformer and said line to stabilize said flame arc.

12. In a flame-arc furnace installation, a pair of electrodes for maintaining a flame arc, an alternating-current line, a mercury-arc rectifier having a larger number of phases than said line, an autotransformer connected between said line and said rectifier to supply the latter with alternating current having a number of phases corresponding to the number of phases of said rectifier for converting the same into direct current, means for supplying said direct current to the electrodes of said furnace for maintaining a flame arc therebetween, and means associated with the alternating current circuit of said rectifier for stabilizing said flame arc.

13. In a flame-arc furnace installation, a pair of electrodes for maintaining a flame arc, an alternating-current line, a polyphase mercury-arc rectifier having a larger number of phases than said line, an autotransformer connected between said line and said rectifier to supply the latter with alternating current having a number of phases corresponding to those of said rectifier for converting the same into direct current, means for supplying said direct current to the electrodes of said furnace to maintain a flame-arc therebetween, and choke coil means included in the circuit between said transformer and said line for stabilizing said flame arc.

14. An arrangement as defined by claim 13, characterized by the fact that the phases of the autotransformer are connected in star.

In testimony whereof we have hereunto subscribed our names this 21 day of October A. D. 1926, at Zurich, Switzerland.

JULIUS JONAS.
WALTER NIGGELER.